_United States Patent Office_ 3,400,742
Patented Sept. 10, 1968

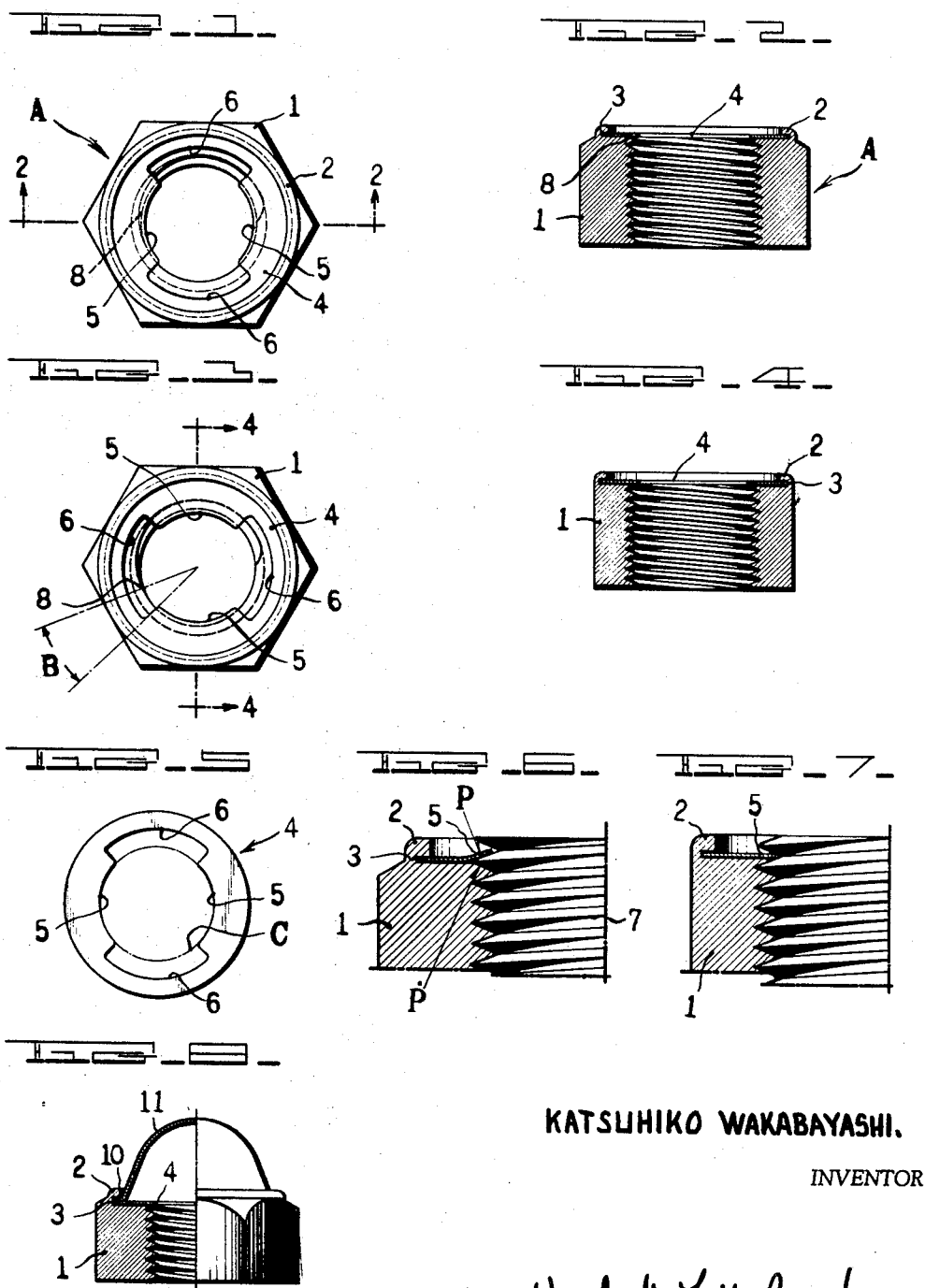

3,400,742
LOCKNUT
Katsuhiko Wakabayashi, Osaka, Japan, assignor to
Takeji Wade, Osaka, Japan
Continuation-in-part of application Ser. No. 545,961,
Apr. 28, 1966. This application Jan. 3, 1968, Ser.
No. 695,407
2 Claims. (Cl. 151—30)

ABSTRACT OF THE DISCLOSURE

A locknut comprises a nut body and a ring of an elastic material. The upper periphery of the nut body is provided with a protrusion having a groove for receiving the ring. The ring has a diametrically opposite pair of pawls and a diametrically opposite pair of cut out portions. The ring is so disposed that the uppermost cut end of the screw thread of the nut may be positioned beneath the central portion of either of the pawls to permit the upper surface of the thread of the bolt engaged with the nut to be pressed by the pawls.

REFERENCE

Part of the subject matter of this application is a continuation-in-part of my copending application Ser. No. 545,961, filed on Apr. 28, 1966, now abandoned.

The present invention relates to an improvement of locknuts.

A principal object of the present invention is to provide a locknut which allows unforced and easy screwing when it is screwed on to bolt and which works to positively and stubbornly prevent itself from becoming loosened once the nut is screwed on to a bolt.

Another principal object of the present invention is to provide a locknut which allows a pair of engageable pawls of an elastic ring used in combination with the nut to be effectively pressed against the upper surface of the screw thread of a bolt to be screwed into a nut thereby to facilitate the screw engagement between the nut and the bolt, effecting firm locking action therebetween without causing damage to the screw thread of the bolt and yet making itself serviceable over a period of repeated use.

Other objects and advantages of the present invention will become apparent from the following detailed description with reference to the accompanying drawings, in which:

FIG. 1 is a plan view of a locknut in accordance with the present invention;

FIG. 2 is a view in cross section along the line 2—2 in FIG. 1;

FIG. 3 is a plan view of a locknut in accordance with the present invention; as a pawl of a ring therein not positioned on the uppermost cut end of the screw thread of the nut;

FIG. 4 is a view in cross section along the line 4—4 in FIG. 3;

FIG. 5 is a fragmentary view in cross section of a locknut in accordance with the present invention, showing the nut engaged with a bolt;

FIG. 6 is a fragmentary view in cross section showing the nut illustrated in FIGS 3 and 4 being engaged with the bolt;

FIG. 7 is a view in cross section showing an embodiment of a locknut in accordance with the present invention as adapted for use as a cap nut; and FIG. 8 is a partially sectional view showing the nut of the subject invention provided with a cap.

Referring to FIGS. 1 and 2, there is shown a nut body 1 having an annular protrusion 2 formed in the peripheral edge of the upper surface thereof, the inner circumferential surface of said protrusion 2 being provided with an annular groove 3 in which is mounted a ring 4 formed of an elastic thin plate for locking the nut body to a bolt, whereby the ring is secured to the nut body as a unitary structure. A pair of diametrically opposite pawls 5 and a pair of similarly disposed cutout portions 6 are formed along the inner periphery of the ring 1, with the boundary between each adjacent pawl 5 and cutout portion 6 located on the imaginary lines radially extending from the center of the ring 1 and quadrisecting it, each of said pawls 5 and cutout portions 6 thus having an equal peripheral width. When the ring 4 is to be mounted on the upper surface of the nut body 1, the ring 4 is so disposed that the uppermost cut end 8 of the screw thread of the nut may be positioned beneath the central portion of either of the pawls of the ring 4. The significance of this positioning in the locknut of the present invention will gradually be understood from the description hereinafter set forth.

When a locknut A thus constructed is brought in engagement with a bolt 7, the screw thread of the bolt 7 driven upward in engagement with the thread of the nut body is further led upwardly from the upper surface of the nut, at first at the uppermost cut end 8 of the nut body 1. At this time, since the ring 4 of the present invention is mounted on the upper surface of the nut body in advance so that the uppermost cut end 8 of the screw thread of the nut body may be positioned beneath the central portion of either of the pawls 5 in the ring 4, the uppermost cut end of the screw thread of bolt 7 contacts said pawl 5 simultaneously upon reaching the upper end of the nut body in engagement with the thread in the nut body. As the nut is further rotated, the bolt 7 is driven upward, forcibly pushing up the pawl 5 of the elastic thin ring with its upper end surface of screw thread thereof, with the result that the pawl 5 presses against the inclined upper surface of the screw thread of the bolt with its repulsive force to thereby restrict free rotation of the locknut A. Further as the nut is moved forward in engagement with the bolt, the other pawl 5 is brought in contact with the inclined upper surface of the screw thread of the bolt, an operation similar to that of the above-described pawl is thereby performed. In this way, due to the pressure P exerted by the pawls 5, repulsive force P' is created to the inclined lower surface of the screw thread of the bolt and sandwiches said screw thread of the bolt effectively whereby the nut is firmly secured on to the bolt. Since the pawls 5 in this case bear again the screw thread of the bolt on its inclined upper surface in surface to surface contact from above, there is no possibility of damaging the screw thread of the bolt and repeated use of the bolt is therefore ensured.

The above-described operation and effects of the locknut in accordance with the present invention is solely attributable to the fact that, as aforementioned, the ring is mounted on the upper surface of the nut in such a manner that the uppermost cut end 8 of the screw thread in the nut body may be positioned beneath the central portion of either of the pawls 5. FIGS. 3, 4 and 7 for instance, illustrate an undesirable case in which the ring is so disposed that the uppermost cut end 8 of the screw thread of the nut body may be located between the pawls of the ring, namely, beneath the cutout portion 6. In the engaging operation in this case the uppermost cut end of the screw thread on the bolt driven out from the upper surface of the nut at the uppermost cut end of the screw thread thereof does not at first abut the pawls of the ring, but is further rotated a distance B shown in FIGS. 3, 4 and 7, whereupon it is brought into engagement with the pawl 5 for the first time. The rotation of the nut or of the bolt for the said distance B means that the uppermost cut end of the screw thread on the bolt has been moved to an upper position so much distance from the upper surface of the nut body. Accordingly, at the time the uppermost cut end of the screw thread of the bolt is brought in contact with the pawl 5, the cut end is positioned above the pawl 5, the pawl 5 thus being located between the ridges of the screw thread of the bolt as shown in FIG. 7 without producing effective locking action which is attainable by the present invention. Considering such a case, it will readily be understood that the position of the pawls of the ring previously described is essential in the present invention.

Furthermore, in addition to the above described structure a locknut of the present invention is so constructed that the diameter C of an imaginary circle involving the inner edges of the pawls of the ring is slightly larger than the root diameter of the thread on the bolt. Therefore, when the locknut is screwed on to the bolt, the inner edges of the pawls are entirely prevented from abutting the roots of the threads on the bolt with the result that the damage to the thread of the bolt is eliminated while the nut can readily be screwed on to the bolt.

While it is desired that the pawls bearing against the upper surface of the screw thread on the bolt for screwing the nut to the bolt be provided with strength and resiliency balancing each other, the pawls of the present invention can be formed with great ease and each of the pawls can readily be given identical strength and resilience since the pawls are provided diametrically opposite to each other with another pair of opposite cutout portions disposed adjacent thereto, said pawls and cutout portions each having an equal inner peripheral length. Moreover, the pawls, having no recesses in the base portions thereof, can maintain satisfactory strength.

Furthermore, the present invention can also provide a cap nut which comprises a cap 11 formed of a thin metal material in hemispherical shape and having a fastening edge 10 radially and outwardly extending along the peripheral portion thereof, said fastening edge 10 and the ring 4 being firmly secured to the annular groove 3 formed in the inner circumferential surface of the annular protrusion of the nut body 1. According to this embodiment, advantageous results can also be obtained as in the above-described locknut.

What I claim is:

1. A locknut comprising a nut body and a ring formed of an elastic thin material, said nut body having an annular protrusion formed in the peripheral edge of the upper surface thereof, and a penetrating hole provided longitudinally in the central portion thereof, the inner peripheral surface of said hole being provided with a screw thread having an uppermost cut end, said ring being firmly secured to the upper surface of said nut body by the outer circular edge thereof being mounted in a groove formed in the inner circumferential surface of said protrusion, and having a pair of diametrically opposite axially flexible pawls and a pair of diametrically disposed cutout portions formed along the inner periphery of said ring between said pawls with the boundary between each adjacent pawl and cutout portion located on imaginary lines radially extending from the center of said ring and thereby quadrisecting said ring, each of said pawls and cutout portions having an equal peripheral width, the diameter of an imaginary circle involving the inner edges of said pawls being larger than the root diameter of a screw thread of a bolt but less than the crest diameter thereof, said ring being mounted on the upper surface of said nut body with said uppermost cut end of the thread on said nut positioned beneath the central portion of one of the two pawls, whereby at the time when a bolt having a screw thread with a forwardmost cut end is screwed on to said nut body and is driven upward on the screw thread of said nut body and reaches the upper end of said nut body, the uppermost cut end of the thread on said nut and the forwardmost cut end of the thread on said bolt meet each other in a position beneath with the result that, upon said nut or bolt being further rotated, the forwardmost cut end of said bolt contacts the under surface of said one pawl and moves upwards, forcibly pushing up the pawl with the inclined leading surface of the screw thread of said bolt thus permitting the pawl to effectively press against the inclined leading surface of the screw thread of said bolt with the repulsive force of the pawl in surface to surface contact thereby preventing free rotation of said nut without causing damage to said nut.

2. A locknut as claimed in claim 1, wherein in the groove formed in the inner circumferential surface of the annular protrusion of said nut body, a cap and said ring are securely mounted together, said cap being formed of a relatively thin metal material in hemispherical shape and provided with a fastening edge radially and outwardly extending along the peripheral portion thereof.

References Cited

FOREIGN PATENTS

| | | |
|---|---|---|
| 1,026,575 | 3/1958 | Germany. |
| 553,953 | 6/1943 | Great Britain. |

CARL W. TOMLIN, *Primary Examiner.*

RAMON S. BRITTS, *Assistant Examiner.*